United States Patent
Yang et al.

(10) Patent No.: US 10,891,433 B2
(45) Date of Patent: Jan. 12, 2021

(54) DATA TRANSFORMATION FOR TIME PERIOD ASSOCIATED DATA

(71) Applicant: Workday, Inc., Pleasanton, CA (US)

(72) Inventors: Wendy Yang, Danville, CA (US); Dylan Owen, Oakland, CA (US); Kevin Chan, Oakland, CA (US); Jonathan David Ruggiero, Danville, CA (US); Daniel G. Rabe, Lafayette, CO (US); Sayan Chakraborty, Niwot, CO (US)

(73) Assignee: Workday, Inc., Pleasanton, CA (US)

( * ) Notice: Subject to any disclaimer, the term of this patent is extended or adjusted under 35 U.S.C. 154(b) by 157 days.

(21) Appl. No.: 15/601,788

(22) Filed: May 22, 2017

(65) Prior Publication Data
US 2018/0336174 A1 Nov. 22, 2018

(51) Int. Cl.
*G06F 16/25* (2019.01)
*G06F 40/18* (2020.01)
*G06Q 40/00* (2012.01)
*G06Q 10/00* (2012.01)

(52) U.S. Cl.
CPC ............ *G06F 40/18* (2020.01); *G06F 16/258* (2019.01); *G06Q 10/00* (2013.01); *G06Q 40/12* (2013.12)

(58) Field of Classification Search
CPC .................... G06F 17/246; G06F 17/2288
See application file for complete search history.

(56) References Cited

U.S. PATENT DOCUMENTS

| | | | |
|---|---|---|---|
| 7,225,189 B1 | 5/2007 | McCormack | |
| 8,756,688 B1* | 6/2014 | Yuksel | G06Q 10/107 709/206 |
| 9,305,176 B2* | 4/2016 | Gloski | G06F 21/6218 |
| 9,652,446 B2* | 5/2017 | Creason | G06F 40/18 |
| 9,674,294 B1* | 6/2017 | Gonthier | H04L 67/08 |
| 10,546,057 B2* | 1/2020 | Eakins | G06F 40/18 |
| 2006/0015805 A1* | 1/2006 | Humenansky | G06F 17/246 715/209 |
| 2008/0016041 A1 | 1/2008 | Frost | |
| 2009/0158251 A1* | 6/2009 | Angrish | G06F 16/84 717/115 |

(Continued)

OTHER PUBLICATIONS

Oracle, as available Mar. 7, 2015, pp. 1-13 (https://docs.oracle.com/cd/E39583_01/fscm92pbr0/eng/fscm/fglr/task_SettingUpandImportingSpreadsheetJournals-9f4b92.html).*

(Continued)

*Primary Examiner* — Scott T Baderman
*Assistant Examiner* — Mario M Velez-Lopez
(74) *Attorney, Agent, or Firm* — Van Pelt, Yi & James LLP

(57) ABSTRACT

A system for data transformation includes a database, a spreadsheet storage of a spreadsheet for planning, an interface, and a processor. The spreadsheet storage is separate from the database. The interface is configured to receive a database datum associated with a large time period. The processor is configured to generate a plurality of spreadsheet data based at least in part on the database datum. Each spreadsheet datum is associated with one of a set of small time periods. The plurality of spreadsheet data is stored in the spreadsheet storage. The spreadsheet storage is separate from the database. The processor is configured to provide the plurality of spreadsheet data for display in the spreadsheet.

21 Claims, 15 Drawing Sheets

(56) References Cited

U.S. PATENT DOCUMENTS

2010/0304731 A1* 12/2010 Bratton .............. H04N 5/23293
455/420
2012/0089562 A1 4/2012 Deremigio
2012/0209845 A1 8/2012 Olivieri
2015/0205847 A1* 7/2015 Gloski ................ G06F 21/6218
707/771

OTHER PUBLICATIONS

Superuser.com, Jan. 2013 https://superuser.com/questions/541260/find-alike-data-in-two-worksheets-and-put-in-3rd-worksheet.*
"Excel 2010 _Insert copied cells_ can only use clipboard once—Microsoft Community" https ://answers. microsoft.com/en-us/offi e/forum/office_2010-excel/excel-2010-insert-copied-cells-can-only-use/ced77d6a-b371-e011-8dfc-68b599b31 bf5, Apr. 28, 2011.
Greg Harvey, "Excel 2010 Ali-in-One for Dummies", Wiley Publishing, Inc., 2010.

* cited by examiner

2016 Finance Actual

| Account | Cost Center | Q1 2016 | Q2 2016 | Q3 2016 | Q4 2016 |
|---|---|---|---|---|---|
| Travel | Marketing | 5,228 | 6,015 | 4,370 | 5,372 |
| Salaries | Marketing | 417,101 | 417,101 | 417,101 | 417,101 |
| Benefits | Marketing | 21,483 | 21,483 | 21,483 | 21,483 |
| Office | Marketing | 992 | 867 | 1023 | 976 |
| Travel | R&D | 2,250 | 2,128 | 2,915 | 1,895 |
| Salaries | R&D | 458,193 | 458,193 | 458,193 | 458,193 |
| Benefits | R&D | 23,645 | 23,645 | 23,645 | 23,645 |
| Office | R&D | 824 | 899 | 915 | 775 |
| Travel | Sales | 10,562 | 12,208 | 41,452 | 8,295 |
| Salaries | Sales | 332,100 | 332,100 | 332,100 | 332,100 |
| Benefits | Sales | 16,192 | 16,192 | 16,192 | 16,192 |
| Office | Sales | 503 | 552 | 715 | 522 |

Fig. 4

| Date | Expense | Account | Cost Center | Amount |
| --- | --- | --- | --- | --- |
| 2016/01/01 | Insurance Empl. #22 | Benefits | Marketing | 1,022 |
| 2016/01/01 | Insurance Empl. #23 | Benefits | Marketing | 1,022 |
| 2016/01/01 | Insurance Empl. #24 | Benefits | Marketing | 1,022 |
| 2016/01/01 | Airfare NYC->Seoul | Travel | Sales | 931 |
| 2016/01/01 | Erasers | Office | R&D | 82 |
| 2016/01/01 | Salary Empl. #14 | Salaries | Sales | 11,152 |
| 2016/01/01 | Salary Empl. #15 | Salaries | Sales | 9,584 |
| 2016/01/01 | Salary Empl. #16 | Salaries | Sales | 11,004 |

Fig. 5

Create Planning Budget

Budget For: [ FY 2017 ]

Data Source: [ FY 2016 ] [ Actuals Only ]

Plan Modification Rules

Dimension: [ Account ]　　Category: [ Salaries ]

Adjustment Percent: [ 104 ]

Dimension: [ Cost Center ]　　Category: [ R&D ] [ Marketing ]

Adjustment Percent: [ 103 ]

Dimension: [ Cost Center ]　　Category: [ Sales ]

Adjustment Percent: [ 102 ]

[ Add Another Rule ]　　　　　　　　[ Create Planning Budget ]

Fig. 6

2017 Budget Planning Spreadsheet 700

| | A | B | C | D | E | F |
|---|---|---|---|---|---|---|
| 1 | Account | Cost Center | Q1 2017 | Q2 2017 | Q3 2017 | Q4 2017 |
| 2 | Travel | Marketing | 5,385 | 6,195 | 4,501 | 5,533 |
| 3 | Salaries | Marketing | 433,785 | 433,785 | 433,785 | 433,785 |
| 4 | Benefits | Marketing | 22,127 | 22,127 | 22,127 | 22,127 |
| 5 | Office | Marketing | 1,022 | 893 | 1,054 | 1,005 |
| 6 | Travel | R&D | 2,318 | 2,192 | 3,002 | 1,952 |
| 7 | Salaries | R&D | 476,521 | 476,521 | 476,521 | 476,521 |
| 8 | Benefits | R&D | 24,354 | 24,354 | 24,354 | 24,354 |
| 9 | Office | R&D | 849 | 926 | 942 | 798 |
| 10 | Travel | Sales | 10,773 | 12,452 | 42,281 | 8,461 |
| 11 | Salaries | Sales | 345,384 | 345,384 | 345,384 | 345,384 |
| 12 | Benefits | Sales | 16,516 | 16,516 | 16,516 | 16,516 |
| 13 | Office | Sales | 513 | 563 | 729 | 532 |
| 14 | | | | | | |
| 15 | | | | | | |
| 16 | | | | | | |
| 17 | | | | | | |
| 18 | | | | | | |

2017 Budget Planning Spreadsheet                    ⌐800

|    | A        | B           | C         | D         | E         | F         |
|----|----------|-------------|-----------|-----------|-----------|-----------|
| 1  | Account  | Cost Center | Q1 2017   | Q2 2017   | Q3 2017   | Q4 2017   |
| 2  | Travel   | Marketing   | 5,385     | 6,195     | 4,501     | 5,533     |
| 3  | Salaries | Marketing   | 433,785   | 433,785   | 433,785   | 433,785   |
| 4  | Benefits | Marketing   | 22,127    | 22,127    | 22,127    | 22,127    |
| 5  | Office   | Marketing   | 1,022     | 893       | 1,054     | 1,005     |
| 6  | Travel   | R&D         | =C15*0.1  | =C15*0.1  | =C15*0.1  | =C15*0.1  |
| 7  | Salaries | R&D         | 476,521   | 476,521   | 476,521   | 476,521   |
| 8  | Benefits | R&D         | 24,354    | 24,354    | 24,354    | 24,354    |
| 9  | Office   | R&D         | 849       | 926       | 942       | 798       |
| 10 | Travel   | Sales       | 10,773    | =C10*1.2  | =C10*4    | =C10      |
| 11 | Salaries | Sales       | 345,384   | 345,384   | 345,384   | 345,384   |
| 12 | Benefits | Sales       | 16,516    | 16,516    | 16,516    | 16,516    |
| 13 | Office   | Sales       | 513       | 563       | 729       | 532       |
| 14 |          |             |           |           |           |           |
| 15 |          |             | =SUM(C2:F2) |         |           |           |
| 16 |          |             |           |           |           |           |
| 17 |          |             |           |           |           |           |
| 18 |          |             |           |           |           |           |

Fig. 8                    802

2017 Budget Planning Spreadsheet 900

|   | A | B | C | D | E | F |
|---|---|---|---|---|---|---|
| 1 | Account | Cost Center | Q1 2017 | Q2 2017 | Q3 2017 | Q4 2017 |
| 2 | Travel | Marketing | 5,385 | 6,195 | 4,501 | 5,533 |
| 3 | Salaries | Marketing | 433,785 | 433,785 | 433,785 | 433,785 |
| 4 | Benefits | Marketing | 22,127 | 22,127 | 22,127 | 22,127 |
| 5 | Office | Marketing | 1,022 | 893 | 1,054 | 1,005 |
| 6 | Travel | R&D | 2,318 | 2,192 | 3,002 | 1,952 |
| 7 | Salaries | R&D | 476,521 | 476,521 | 476,521 | 476,521 |
| 8 | Benefits | R&D | 24,354 | 24,354 | 24,354 | 24,354 |
| 9 | Office | R&D | 849 | 926 | 942 | 798 |
| 10 | Travel | Sales | 10,773 | 12,452 | 42,281 | 8,461 |
| 11 | Demo | Sales | 2,000 | 2,000 | 3,000 | 2,000 |
| 12 | Salaries | Sales | 345,384 | 345,384 | 345,384 | 345,384 |
| 13 | Benefits | Sales | 16,516 | 16,516 | 16,516 | 16,516 |
| 14 | Office | Sales | 513 | 563 | 729 | 532 |
| 15 |   |   |   |   |   |   |
| 16 |   |   |   |   |   |   |
| 17 |   |   |   |   |   |   |
| 18 |   |   |   |   |   |   |

Fig. 9

2017 Budget Planning Spreadsheet 1000

|   | A | B | C | D | E | F |
|---|---|---|---|---|---|---|
| 1 | Account | Cost Center | Q1 2017 | Q2 2017 | Q3 2017 | Q4 2017 |
| 2 | Travel | Marketing | 5,385 | 6,195 | 4,501 | 5,533 |
| 3 | Salaries | Marketing | 433,785 | 433,785 | 433,785 | 433,785 |
| 4 | Benefits | Marketing | 22,127 | 22,127 | 22,127 | 22,127 |
| 5 | Office | Marketing | 1,022 | 893 | 1,054 | 1,005 |
| 6 | Travel | R&D | 2,318 | 2,192 | 3,002 | 1,952 |
| 7 | Salaries | R&D | 476,521 | 476,521 | 476,521 | 476,521 |
| 8 | Benefits | R&D | 24,354 | 24,354 | 24,354 | 24,354 |
| 9 | Travel | Sales | 10,773 | 12,452 | 42,281 | 8,461 |
| 10 | Salaries | Sales | 345,384 | 345,384 | 345,384 | 345,384 |
| 11 | Benefits | Sales | 16,516 | 16,516 | 16,516 | 16,516 |
| 12 | Office | Sales | 513 | 563 | 729 | 532 |
| 13 |  |  |  |  |  |  |
| 14 |  |  |  |  |  |  |
| 15 |  |  |  |  |  |  |
| 16 |  |  |  |  |  |  |
| 17 |  |  |  |  |  |  |
| 18 |  |  |  |  |  |  |

Fig. 10

DATA TRANSFORMATION FOR TIME PERIOD ASSOCIATED DATA

BACKGROUND OF THE INVENTION

Organization planning systems typically allow managers to create plans for managing their organization in an upcoming time period (e.g., the next year). Plans typically include plans for allocating resources (e.g., workers, finances, manufacturing capacity, etc.) among a set of departments and projects. If a planning system is a standalone system (e.g., is isolated from implementation systems and recordkeeping systems), it becomes difficult to compare a plan with actual data and to base an upcoming year plan on the actual data. This creates a problem where planning can become decoupled from reality.

BRIEF DESCRIPTION OF THE DRAWINGS

Various embodiments of the invention are disclosed in the following detailed description and the accompanying drawings.

FIG. 4 is a diagram illustrating an embodiment of a table showing finance actual data.

FIG. 5 is a diagram illustrating an embodiment of a set of finance journal line entries.

FIG. 6 is a diagram illustrating an embodiment of a user interface for creating a planning budget.

FIG. 7 is a diagram illustrating an embodiment of a planning spreadsheet.

FIG. 8 is a diagram illustrating an embodiment of a planning spreadsheet including an expression.

FIG. 9 is a diagram illustrating an embodiment of a planning spreadsheet including an inserted row.

FIG. 10 is a diagram illustrating an embodiment of a planning spreadsheet after deletion of a row.

DETAILED DESCRIPTION

Figure 1:
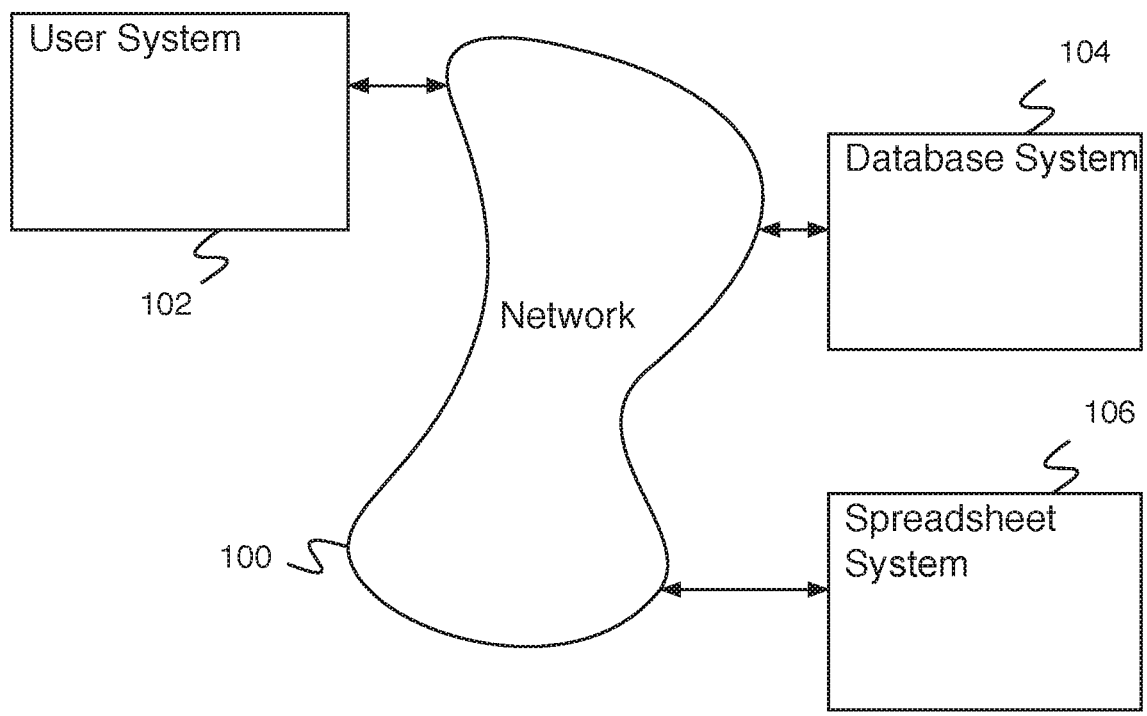
FIG. 1 is a block diagram illustrating an embodiment of a network system comprising a database system and a spreadsheet system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for data transformation for time period associated data is disclosed. The system comprises a database, a spreadsheet storage, an interface, and a processor. The interface is configured to receive a database datum associated with a large time period. The processor is configured to generate a plurality of spreadsheet data based on the database datum. Each spreadsheet datum is associated with one of a set of small time periods. The processor is further configured to provide the plurality of spreadsheet data for display in a spreadsheet. In some embodiments, the system for data transformation additionally comprises a memory coupled to the processor and configured to provide the processor with instructions.

A system for updating database data associated with spreadsheet structures is disclosed. The system comprises a database, a spreadsheet storage, an interface, and a processor. The interface is configured to receive an indication to modify a spreadsheet. The processor is configured to store a modification in the spreadsheet storage based at least in part on the indication; determine one or more objects to change in the database based at least in part on the indication, and cause change to the one or more objects in the database. In some embodiments, the system for database updating additionally comprises a memory coupled to the processor and configured to provide the processor with instructions.

In some embodiments, a system for data transformation and a system for data updating comprise database system and a spreadsheet system. The systems enable more efficient and rapid planning. Planning can involve determining an allocation of resources (e.g., finances, workers, etc.) to entities (e.g., workers, teams, organizations, projects, etc.)— for example, in a table of resources vs. entities. Typically, the determination of the allocations relies on a snapshot view of the current data (e.g., as stored in a database system) and then manipulation of the data to establish the allocation. Unfortunately, as the manipulation continues (e.g., in a spreadsheet system) or later as the allocation is utilized, often the underlying data from the database that was acquired in the snapshot changes. The changing of the underlying data in the database system may change a desired allocation, but this will not be seen by a user unless the data is reacquired using another snapshot. In some embodiments, the spreadsheet system has an actively updated set of data from the database system—so that the data viewed as part of the planning process is the data currently in the database or is data that is derived from the data currently in the database.

In some embodiments, the database system comprises a system for storing data (e.g., planning data and actual data). In some embodiments, the spreadsheet system which enables data transformation comprises a system for receiving actual data (e.g., actual finances allocated to groups of an organization in a particular quarter or year) and creating planning data. In various embodiments, creating planning data comprises creating planning data equal to actual data from a previous period, creating planning data comprising scaled actual data from a previous period, creating planning objects for storing planning data in a database, or creating any other appropriate planning data. In some embodiments, creating planning data comprises combining actual data (e.g., individual transactions, journal entries, etc.) to create combined data (e.g., monthly aggregated data, quarterly aggregated data, etc.). A system user requests to create a plan based on previous data and is presented with a planning spreadsheet comprising combined and transformed previous data. The system user is then able to interact with the planning spreadsheet in any desired way (e.g., modifying data, adding rows, deleting rows, creating dependencies based on equations, etc.). In some embodiments, the planning spreadsheet comprises a scratch area that is not connected with the database, and a writeback area, wherein changes to the writeback area are reflected in the database. When the writeback area of the planning spreadsheet is modified, corresponding planning objects in the database are modified. In the event the planning spreadsheet is modified by adding rows, one or more planning objects are added to the database. In the event the planning spreadsheet is modified by deleting rows, one or more planning objects are deleted from the database.

FIG. 1 is a block diagram illustrating an embodiment of a network system comprising a database system and a spreadsheet system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, database system 104, and spreadsheet system 106 communicate via network 100. In some embodiments, user system 102 comprises a user system for use by a user. In various embodiments, user system 102 comprises a system for executing applications, processing data, displaying data, displaying images, displaying video, accessing database records, creating planning data, communicating with one or more server systems, or performing any other appropriate user system action. In various embodiments, database system 104 comprises a database system for storing database data, providing database data, operating on database data, or for any other appropriate purpose. In various embodiments, spreadsheet system 106 comprises a spreadsheet system for creating spreadsheets, performing spreadsheet operations, providing a spreadsheet user interface, or for any other appropriate purpose. In some embodiments, spreadsheet system 106 comprises a system for data transformation for time period associated data. In some embodiments, spreadsheet system 106 comprises a system for planning. In some embodiments, database system 104 and spreadsheet system 106 comprise the same system.

Figure 2:
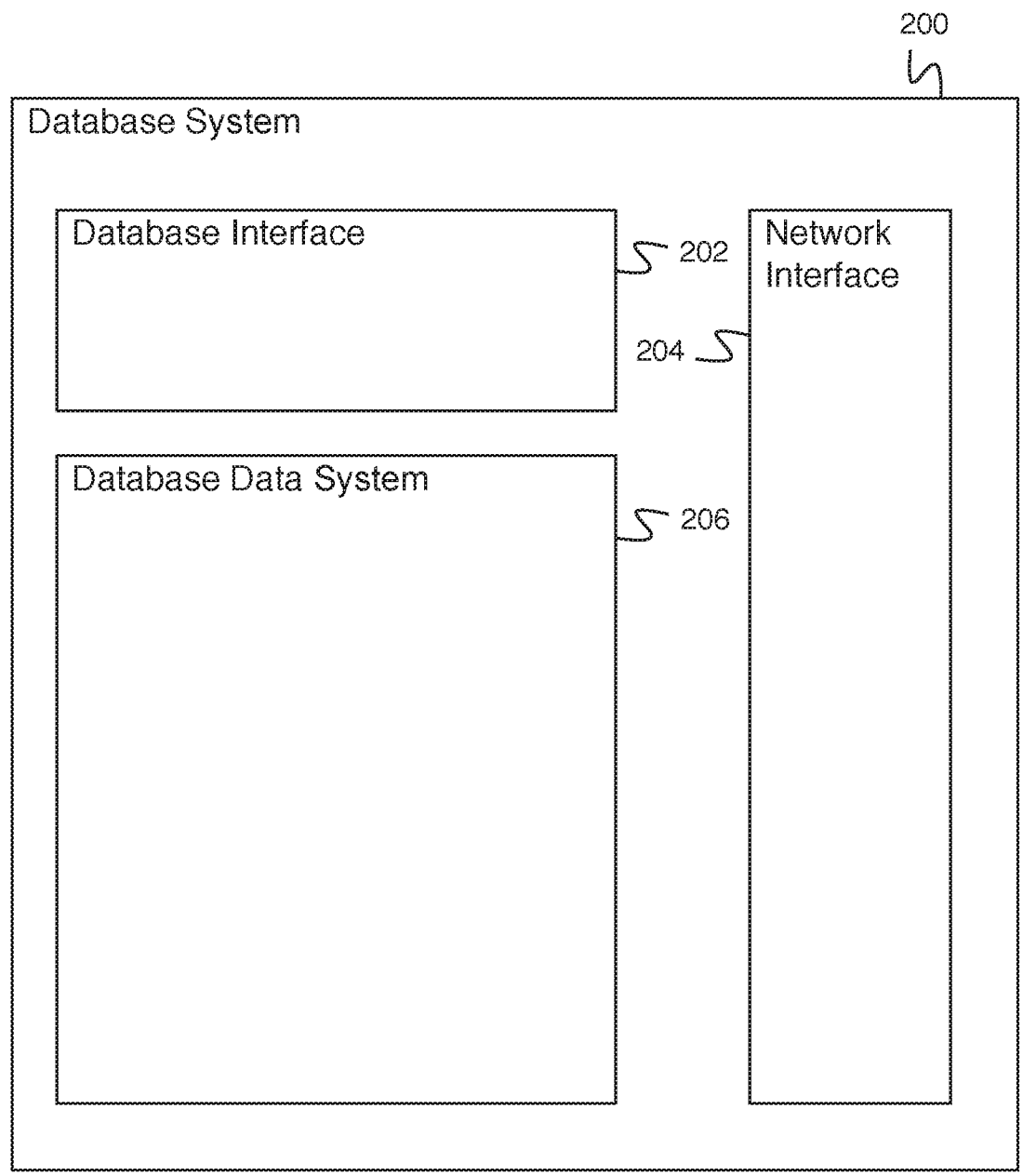
FIG. 2 is a block diagram illustrating an embodiment of a database system.

FIG. 2 is a block diagram illustrating an embodiment of a database system. In some embodiments, database system 200 comprises database system 104 of FIG. 1. In the example shown, database system 200 comprises database interface 202. In various embodiments, database interface 202 comprises a database interface for accessing database data (e.g., database data system 206), for adding database data (e.g., to database data system 206), for searching database data, or for interfacing with database data in any other appropriate way. In some embodiments, database interface 202 comprises a processor. Network interface 204 comprises an interface for communication via a network. In various embodiments, network interface 204 comprises a network interface for communicating with a user system, a spreadsheet system, the Internet, or any other appropriate system or network. In some embodiments, network interface 204 is implemented using a processor. Database data system 206 comprises a database system for storing database data. In various embodiments, database data comprises finance data, human resources data, resource allocation data, planning data or any other appropriate data. In some embodiments, database data system 206 is implemented using a processor. In various embodiments, the elements of database system 200 are implemented each on a separate processor, all on a single processor, or combined onto a plurality of processors in any other appropriate way. In some embodiments, database system 200 additionally comprises a data storage.

Figure 3:
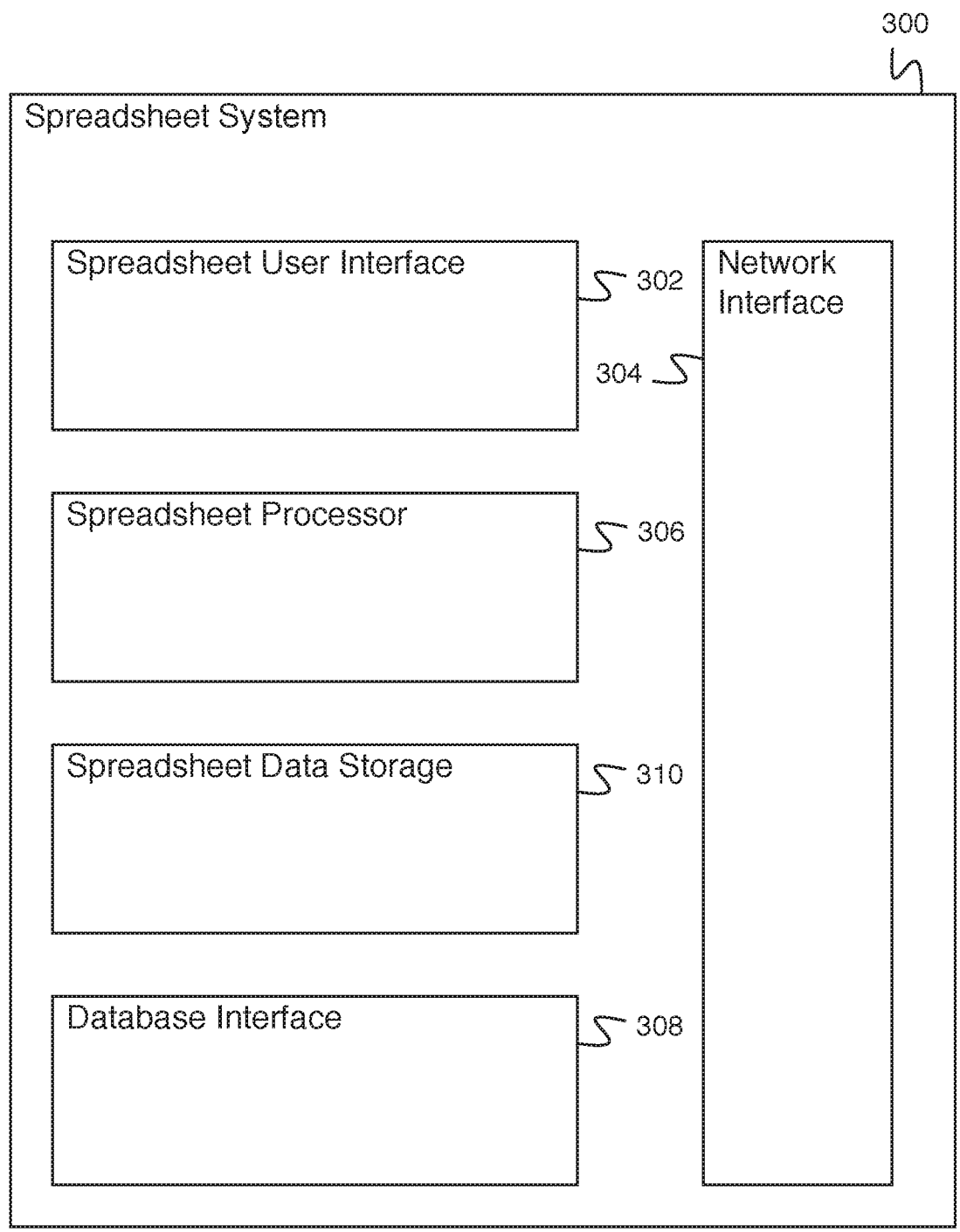
FIG. 3 is a block diagram illustrating an embodiment of a spreadsheet system.

FIG. 3 is a block diagram illustrating an embodiment of a spreadsheet system. In some embodiments, spreadsheet system 300 comprises spreadsheet system 106 of FIG. 1. In some embodiments, spreadsheet system 300 comprises a system for data transformation for time period associated data. In the example shown, spreadsheet system 300 comprises spreadsheet user interface 302. In various embodiments, spreadsheet user interface 302 comprises a spreadsheet user interface for receiving a spreadsheet command (e.g., create new spreadsheet, create planning spreadsheet based on data, add data, delete data, modify data, add row, delete row, etc.), for providing spreadsheet data, for providing spreadsheet formatting information, or for any other appropriate spreadsheet user interface purpose. In some embodiments, spreadsheet user interface 302 is implemented using a processor. Spreadsheet processor 306 comprises a processor for processing commands for spreadsheet functionality. In various embodiments, spreadsheet processor 306 creates a spreadsheet using database data, using modified database data, using blank data, using user-supplied data, or using any other appropriate data. In some embodiments, spreadsheet processor 306 is implemented using one or more processors. Database interface 308 comprises a database interface for interacting with a database. In various embodiments, database interface 308 requests data from a database, provides data to a database, provides indications to modify data in a database, or interacts with a database in any other appropriate way. Network interface 304 comprises an interface for communication via a network. In various embodiments, network interface 304 comprises a network interface for communicating with a user system, a database system, the Internet, or any other appropriate system or network. In some embodiments, network interface 304 is implemented using a processor. In various embodiments, the elements of spreadsheet system 300 are implemented each on a separate processor, all on a single processor, or combined onto a plurality of processors in any other appropriate way. In some embodiments, spreadsheet system 300 additionally comprises a spreadsheet data storage 310 for storing data associated with the spreadsheet system. In various embodiments, the spreadsheet data storage 310 includes a scratch area (e.g., data not connected to another system—only locally stored), an input data storage area (e.g., data synchronized from another system—for example, pointers to database storage system or data derived from pointed to data), writeback area (e.g., data synchronized to another system—for example, pointers to database storage system), or any other appropriate storage area.

FIG. 4 is a diagram illustrating an embodiment of a table showing finance actual data. In some embodiments, the table of FIG. 4 comprises a table showing how much money was spent on each account (e.g., travel, salaries, benefits, office) of each cost center (e.g., marketing, R&D, sales) of an organization. In the example shown, money spent by the four accounts of each of the three cost centers is shown for each of the four quarters of 2016. In some embodiments, the data of the table of FIG. 4 is retrieved from a database (e.g., from database system 104 of FIG. 1). In some embodiments, the data of the table is displayed using a spreadsheet system. In various embodiments, the data of the table is synchronized to data stored in a database system or derived from data synchronized to stored data in the database system. In some embodiments, the data of the table is not stored in the spreadsheet system, but is pointed to from the spreadsheet system and is stored in a database system or is derived from such data. In some embodiments, the data of the table of FIG. 4 is compiled or calculated from a set of finance data entries (e.g., finance journal line entries).

FIG. 5 is a diagram illustrating an embodiment of a set of finance journal line entries. In some embodiments, finance journal line entries of FIG. 5 are stored in a database (e.g., using database system 104 of FIG. 1). In the example shown, each finance journal line entry comprises a date, an expense description, an account, a cost center, and an amount. Finance journal line entries can be aggregated by any appropriate criteria (e.g., account, cost center, time period, etc.). In some embodiments, finance journal line entries are aggregated to form a table showing finance actual data (e.g., the table of FIG. 4). In some embodiments, data stored in a database system is aggregated to determine data used as a basis for planning—for example, individual entries associated with a time or time period are aggregated to determine base data for planning associated with a longer time period and/or cost center. So, for example, the journal entries for a quarter are aggregated for a given account and for a given cost center and provided for planning data.

FIG. 6 is a diagram illustrating an embodiment of a user interface for creating a planning budget. In some embodiments, the user interface of FIG. 6 comprises a user interface for creating a planning budget based at least in part on previous budget information. In the example shown, selections have been made to create a budget for fiscal year 2017 based on data from fiscal year 2016 actuals. In various embodiments, a planning budget can be based on actual data, planning data, a combination of actual and planning data, or any other appropriate data. The user interface of FIG. 6 additionally comprises a set of plan modification rules. The plan modification rules comprise rules for modifying source data in the planning budget. In the example shown, three plan modification rules are described. A first plan modification rule indicates that budget information with the salaries account is to be increased to 104 percent of the previous version in the planning budget. A second plan modification rule indicates that budget information with either the R&D or marketing cost center is to be increased to 103 percent of the previous version in the planning budget. A third plan modification rule indicates that budget information with the sales cost center is to be increased to 102 percent of the previous version in the planning budget.

In some embodiments, a plan modification rule can affect only budget information that meets criteria in more than one dimension (e.g., budget information with the salaries account and the sales cost center is to be increased to 105 percent of the previous version in the planning budget). When a user has specified the desired plan data source and plan modification rules, the user can indicate to create the planning budget. In some embodiments, in response to the indication to create the planning budget, a system for data transformation collects database data according to the plan data source, transforms the data according to the plan modification rules, aggregates the data according to a time period, and provides the planning data to a user in the form of a spreadsheet. In various embodiments, interfaces similar to that of FIG. 6 are used to create a planning budget for finances, personnel allocation, manufacturing capacity, or any other appropriate resource for allocation.

FIG. 7 is a diagram illustrating an embodiment of a planning spreadsheet. In some embodiments, planning spreadsheet 700 comprises a planning spreadsheet produced as a result of a transformation executed in response to an indication to create a planning budget. In the example shown, planning spreadsheet 700 comprises a set of rows associated with accounts of cost centers (e.g., rows 2 through 13) and a set of columns associated with quarters of 2017 (e.g., column C through F). The spreadsheet comprises data for each cell (e.g., an account of a cost center for a quarter) indicating a planned amount to spend. In some embodiments, the data entered in the cells of planning spreadsheet 700 comprises the data of the table of FIG. 4 modified by the plan modification rules as specified in the user interface of FIG. 6. In the example shown, spreadsheet 700 comprises writeback area 702 (e.g., rows 2 through 13 and columns A through F, indicated by a dashed line at the perimeter of the writeback area). In some embodiments, changes to the writeback area of the spreadsheet are propagated to a database. In some embodiments, changes outside the writeback area of the spreadsheet are not propagated to a database (e.g., the region of the spreadsheet outside the writeback area can be used for temporary notes or scratch calculations, for building expressions that can be referred to within the writeback area, or for any other appropriate purpose). In some embodiments, in the event a user changes the value in a cell of planning spreadsheet 700, the change is reflected by a change in one or more planning objects stored in a database. In some embodiments, in the event a user deletes a row of planning spreadsheet 700, the deletion is reflected by the deletion of one or more planning object stored in a database. In some embodiments, in the event a user creates a new row of planning spreadsheet 700, the creation is reflected by the creation of one or more planning objects stored in a database (e.g., populated with blank data, default data, copied data, projected data or any other appropriate data).

FIG. 8 is a diagram illustrating an embodiment of a planning spreadsheet including an expression. In the example shown, planning spreadsheet 800 comprises expression 802 in cell C15. Expression 802 indicates cell C15=SUM(C2:F2), e.g., causing cell C15 to be the total yearly travel budget for the marketing department. Cells C6, C7, C8, and C9 each are set equal to C15*0.1, indicating that the quarterly travel budget for the R&D department is set to be one tenth the yearly travel budget for the marketing department. In addition, the quarterly travel budget for each quarter for the sales department is set to be a fixed multiple of the first quarter travel budget, e.g., the second quarter budget is set to 1.2 times the first quarter, the third quarter 4 times the first quarter, and the fourth quarter equal to the first quarter. In this way the entire year budget can be adjusted by changing only the first quarter budget and allowing the other quarters to track accordingly.

FIG. 9 is a diagram illustrating an embodiment of a planning spreadsheet including an inserted row. In the example shown, spreadsheet 900 comprises planning spreadsheet 700 of FIG. 7 including an inserted row. Row 11 corresponds to a new demo account in the sales department. Data indicating a planned quarterly budget for the new account has been inserted into the spreadsheet (e.g., 2000 for the first quarter, 2000 for the second quarter, 3000 for the third quarter, and 2000 for the fourth quarter). In some embodiments, when the new row is inserted, one or more new planning objects corresponding to the row are created in the database. In the example shown, when the new row is inserted, rows in the planning spreadsheet below the new row are shifted downwards to accommodate the new row. In various embodiments, when a new row is created, the new row is filled with copied data (e.g., copied from another row in the spreadsheet), data based at least in part on nearby data, blank data, projected data, or any other appropriate data.

FIG. 10 is a diagram illustrating an embodiment of a planning spreadsheet after deletion of a row. In the example shown, spreadsheet 1000 comprises planning spreadsheet 700 of FIG. 7 after deletion of a row. Row 9 of FIG. 7 has been deleted. In some embodiments, when the row is deleted, one or more planning objects corresponding to the row are deleted in the database. In the example shown, when the row is deleted, rows in the planning spreadsheet below the deleted row are shifted upwards to remove the gap.

Figure 11:
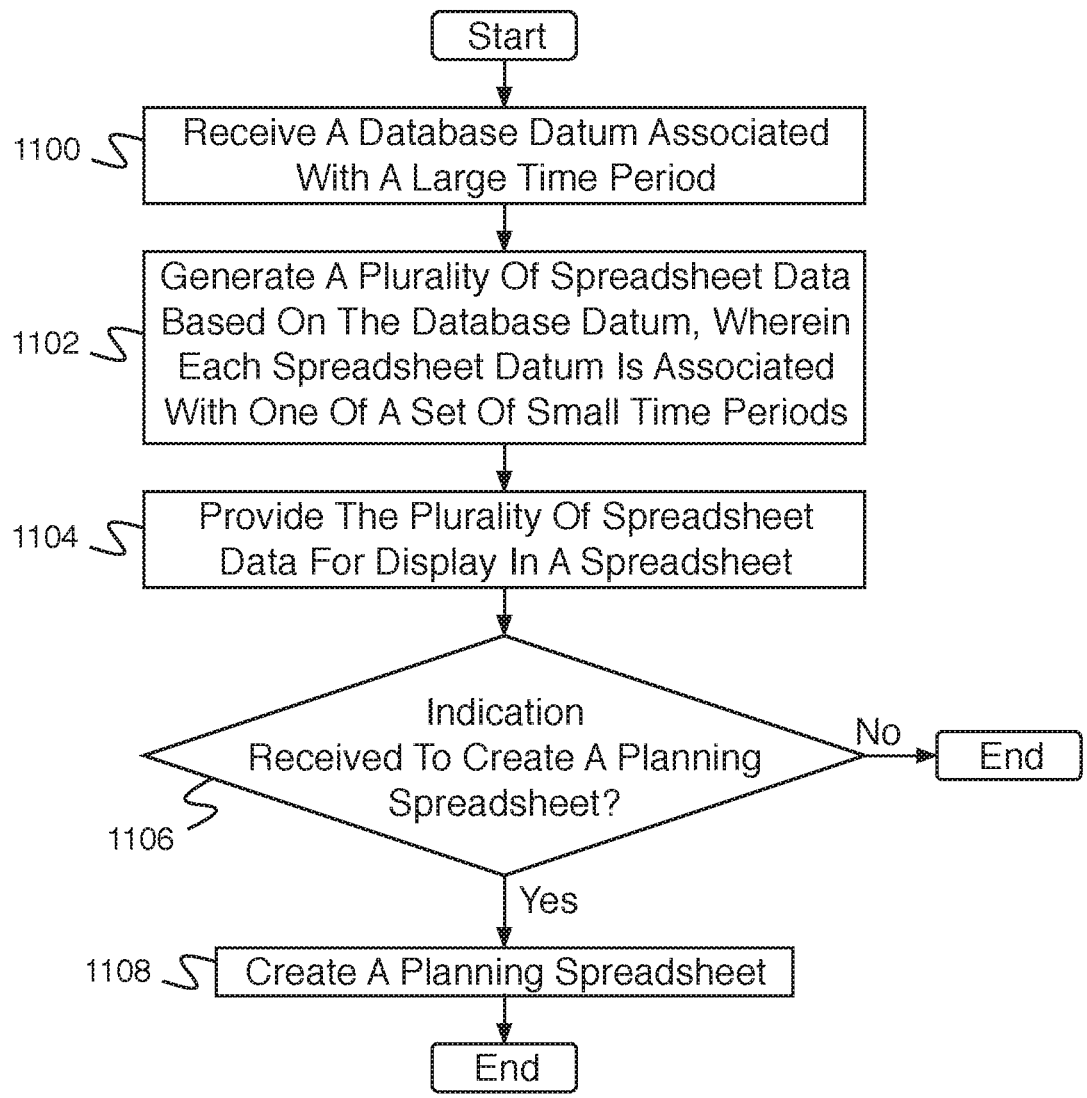
FIG. 11 is a flow diagram illustrating an embodiment of a process for data transformation.

FIG. 11 is a flow diagram illustrating an embodiment of a process for data transformation. In some embodiments, the process of FIG. 11 is performed by spreadsheet system 106 of FIG. 1. In the example shown, in 1100, a database datum associated with a large time period is received. In various embodiments, the large time period comprises one of a decade, a year, a quarter, a month, a week, or any other appropriate large time period. In some embodiments, the database datum comprises numeric data (e.g., a specific year, a specific quarter, etc.). In 1102, a plurality of spreadsheet data is generated based on the database datum, wherein each spreadsheet datum is associated with one of a set of small time periods. In some embodiments, a small time period of the set of small time periods is smaller than the large time period. In various embodiments, a small time period of the set of small time periods comprises one of a year, a quarter, a month, a week, a day, or any other appropriate small time period. In some embodiments, labels for cells of small time periods are generated. In some embodiments, the set of small time periods together comprises the large time period. In some embodiments, each spreadsheet datum is determined by aggregating a set of journal lines. In various embodiments, aggregating journal lines comprises searching for journal lines, searching for journal lines associated with similar data, searching for journal lines associated with a time in the large time period, searching for journal lines associated with a group, aggregating values of similar journal lines, aggregating values of associated journal lines, or aggregating values of journal lines in any other appropriate way. In 1104, the plurality of spreadsheet data is provided for display in a spreadsheet. In some embodiments, the plurality of spreadsheet data is provided for display in spreadsheet cells. In 1106, it is determined whether an indication is received to create a planning spreadsheet. In the event it is determined that an indication to create a planning spreadsheet is not received, the process ends. In the event it is determined that an indication to create a planning spreadsheet is received, control passes to 1108. In 1108, a planning spreadsheet is created.

Figure 12:
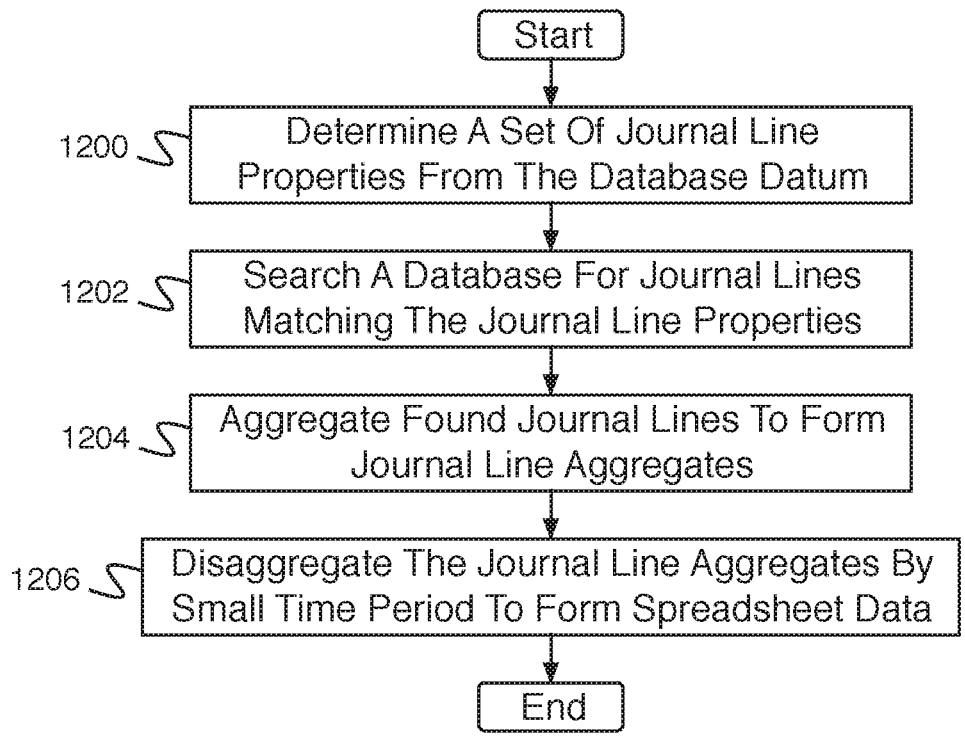
FIG. 12 is a flow diagram illustrating an embodiment of a process for generating a plurality of spreadsheet data based on a database datum.

FIG. 12 is a flow diagram illustrating an embodiment of a process for generating a plurality of spreadsheet data based on a database datum. In some embodiments, the process of FIG. 12 implements 1102 of FIG. 11. In the example shown, in 1200, a set of journal line properties is determined from the database datum. In various embodiments, the set of journal line properties comprises a time period property, a group property, an account property, a cost center property, or any other appropriate property. In 1202, a database is searched for journal lines matching the journal line properties. In 1204, found journal lines are aggregated to form journal line aggregates. In various embodiments, aggregating journal lines comprises summing journal line values, grouping journal lines, sorting journal lines, or aggregating journal lines in any other appropriate way. In some embodiments, journal line aggregates are rounded. In 1206, the journal line aggregates are disaggregated by small time period to form spreadsheet data. In some embodiments, disaggregating journal line aggregates by small time period comprises separating journal line aggregates into sub-aggregates, wherein journal lines of a sub-aggregate are associated with the same small time period. In some embodiments, journal lines are aggregated directly (e.g., in 1204) into aggregates associated with a small time period. In some embodiments, disaggregating journal line aggregates by small time period comprises evenly distributing data among smaller time periods. In some embodiments, disaggregating journal line aggregates by small time period comprises distributing data among smaller time periods according to rules. In some embodiments, labels associated with small time periods are generated. In some embodiments, spreadsheet data is rounded.

Figure 13:
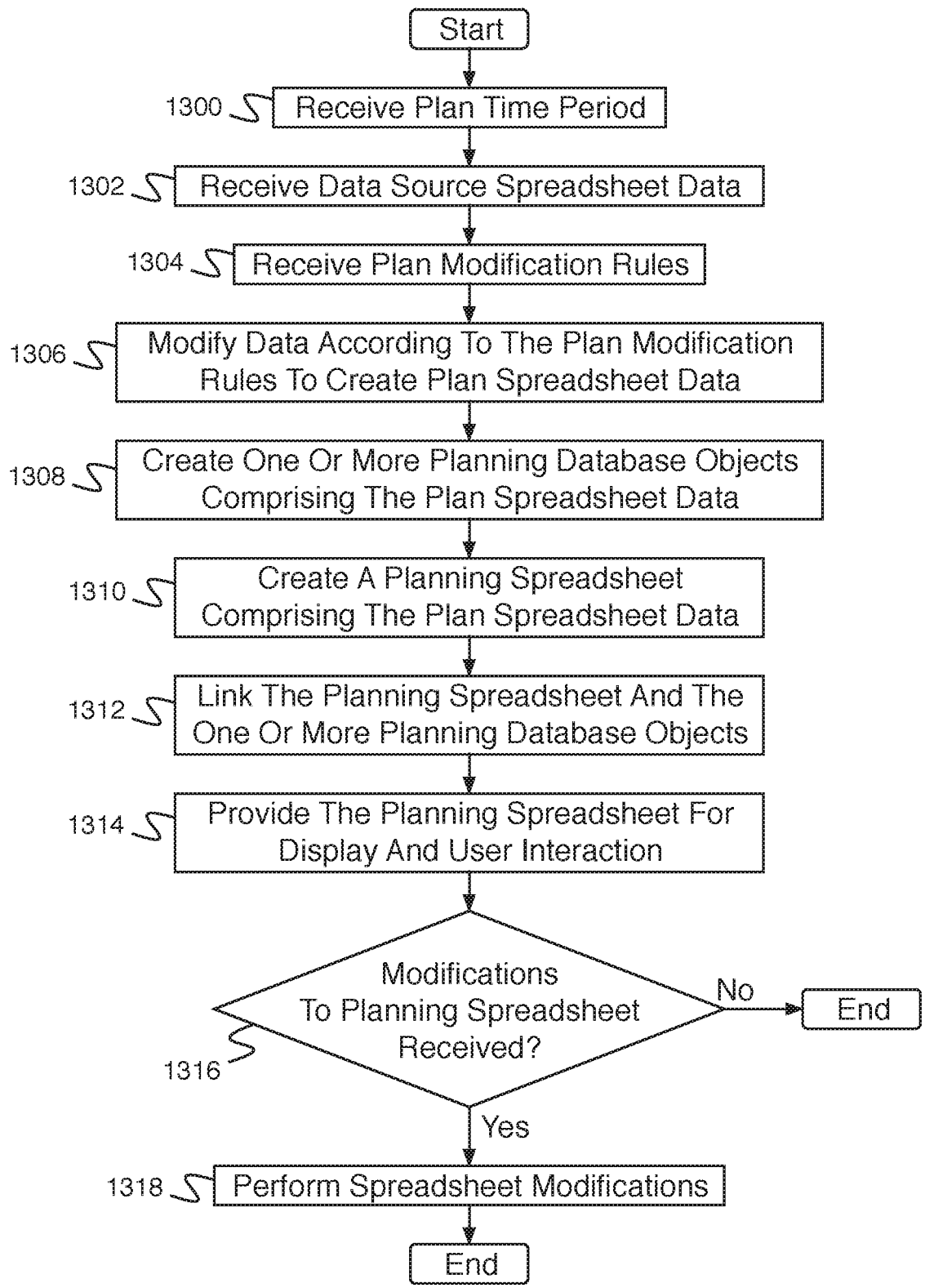
FIG. 13 is a flow diagram illustrating an embodiment of a process for creating a planning spreadsheet.

FIG. 13 is a flow diagram illustrating an embodiment of a process for creating a planning spreadsheet. In some embodiments, the process of FIG. 13 implements 1108 of FIG. 11. In the example shown, in 1300, a plan time period is received. In 1302, data source spreadsheet data is received. In 1304, plan modification rules are received. In some embodiments, plan modification rules comprise plan modification rules as shown in FIG. 6. In some embodiments, a plan modification rule applies differently to different data subgroups. In some embodiments, a plan modification rule comprises a spreadsheet function. In some embodiments, a plan modification rule is based at least in part on a spreadsheet cell. In 1306, data is modified according to the plan modification rules to create plan spreadsheet data. In 1308, one or more planning database objects are created comprising the plan spreadsheet data. In 1310, a planning spreadsheet is created comprising the plan spreadsheet data. In 1312, the planning spreadsheet and the one or more planning database objects are linked. In 1314, the planning spreadsheet is provided for display and user interaction. In 1316, it is determined whether modifications to the planning spreadsheet are received. In the event it is determined that modifications to the planning spreadsheet are not received, the process ends. In the event it is determined that modifications to the planning spreadsheet are received, control passes to 1318. In 1318, spreadsheet modifications are performed.

Figure 14:
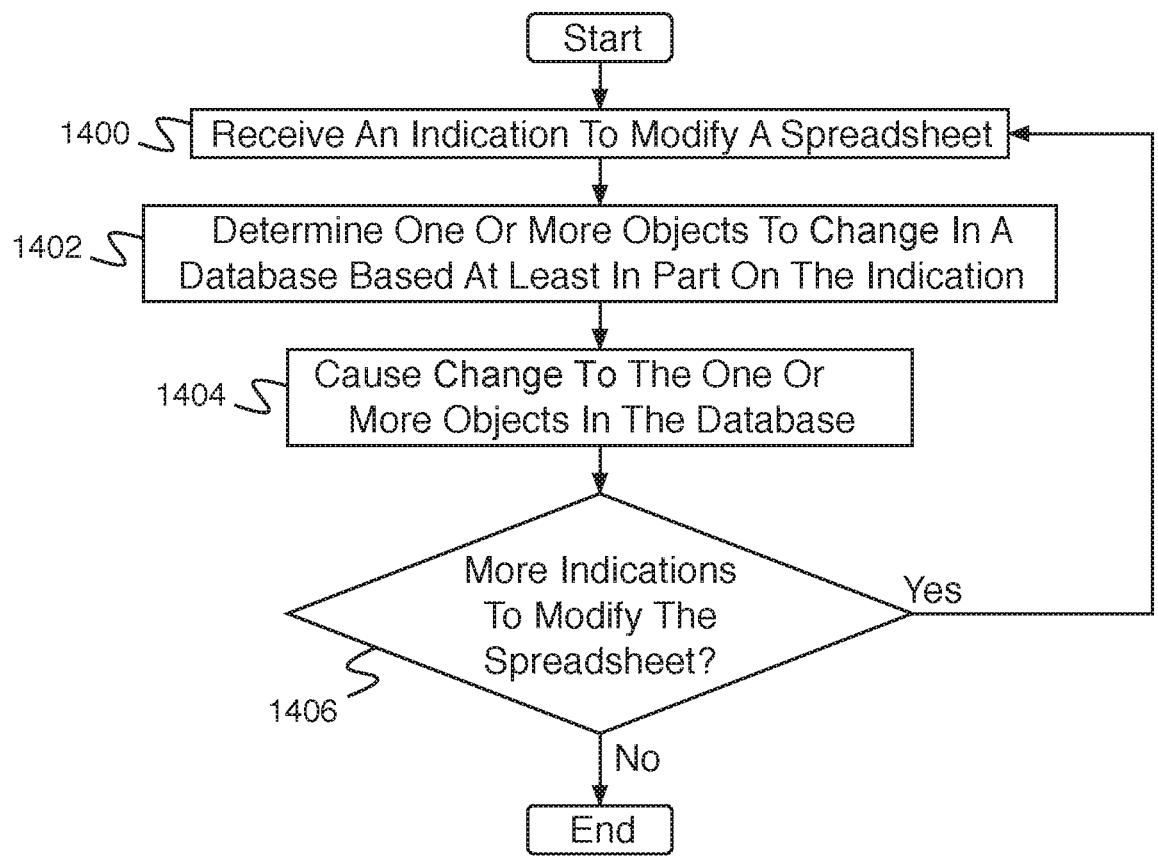
FIG. 14 is a flow diagram illustrating an embodiment of a process for performing spreadsheet modifications.

FIG. 14 is a flow diagram illustrating an embodiment of a process for performing spreadsheet modifications. In some embodiments, the process of FIG. 14 implements 1318 of FIG. 13. In the example shown, in 1400, an indication to modify a spreadsheet is received. In various embodiments, modification comprises adding a row, modifying spreadsheet data, deleting a row, or any other appropriate spreadsheet modification. In 1402, one or more objects to change in a database are determined based at least in part on the indication. In some embodiments, in the event that the indication to modify the spreadsheet comprises an indication to create a new row, one or more objects to create in the database are determined based at least in part on the indication. In some embodiments, in the event that the indication to modify the spreadsheet comprises an indication to delete a row, one or more objects to delete in the database are determined based at least in part on the indication. In 1404, change to the one or more objects in the database is caused. In some embodiments, change to the one or more objects in the database comprises creation of the one or more objects in the database. In various embodiments, in the event the change comprises adding a new row, the new row data comprises a copy of existing row data, the new row data comprises empty row data, the new row data comprises data based on nearby database data, the new row data comprises projected data, or the new row data comprises any other appropriate new row data. In various embodiments, projected data comprises numerical data, data determined based on rules, database determined by distributing values into lines associated with groups, or any other appropriate projected data. In some embodiments, projected data is based at least in part on database data. In some embodiments, the projected data is stored in the database. In some embodiments, the one or more objects to create in the database comprise data corresponding to the new row data. In some embodiments, the one or more objects are stored in the database. In some embodiments, change to the one or more objects in the database comprises deletion of the one or more objects in the database. In 1406, it is determined whether there are more indications to modify the spreadsheet. In the event it is determined that there are more indications to modify the spreadsheet, control passes to 1400. In the event it is determined that there are not more indications to modify the spreadsheet, the process ends.

Figure 15:
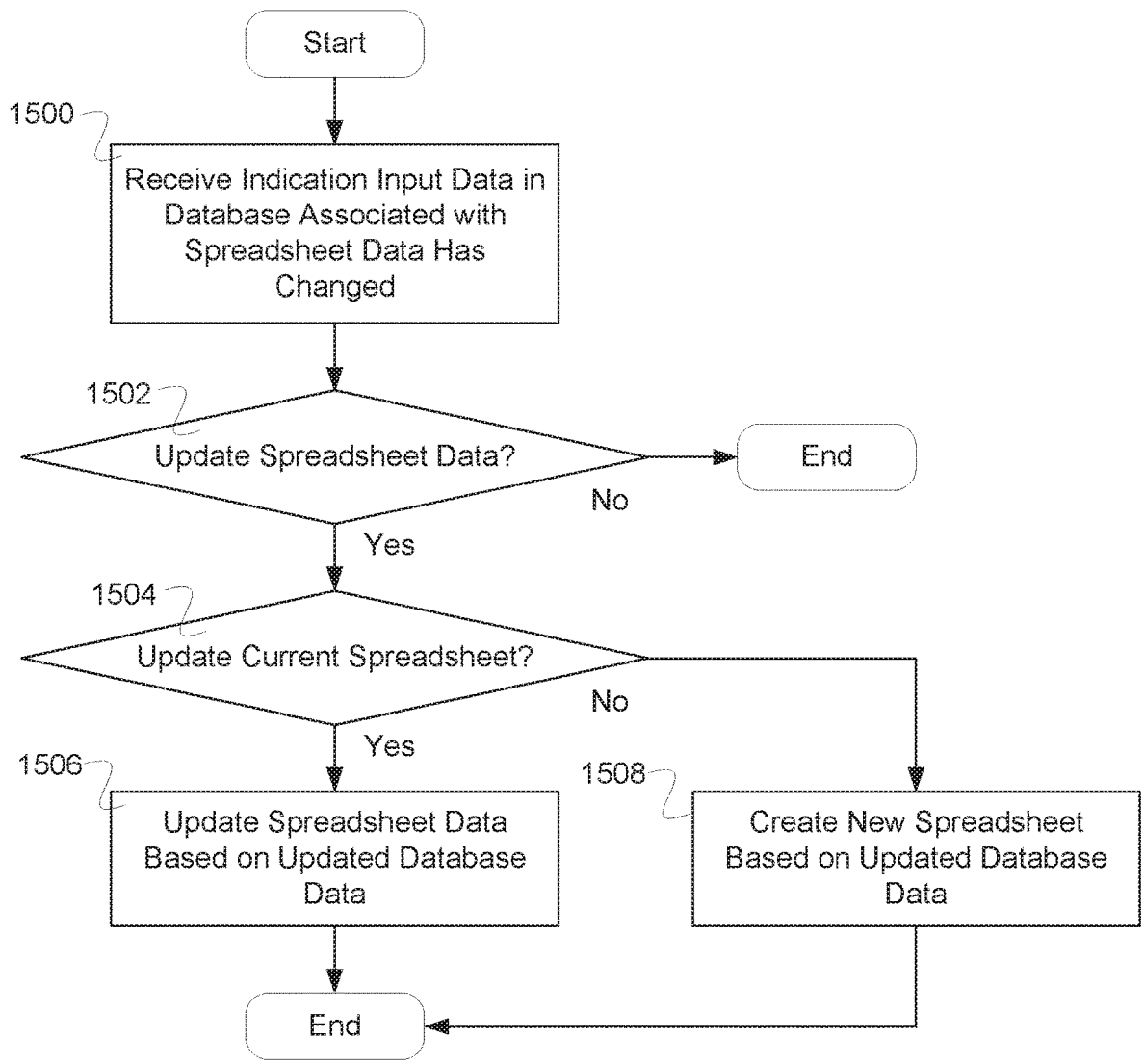
FIG. 15 is a flow diagram illustrating an embodiment of a process for updating spreadsheet data.

FIG. 15 is a flow diagram illustrating an embodiment of a process for updating spreadsheet data. In the example shown, in 1500 an indication is received that input data in the database associated with spreadsheet data has changed. For example, an indication is received that a data in the database (e.g., a journal entry) has been written to, modified, or otherwise changed. In some embodiments, the indication is triggered in the event that a write transaction writes a value into the database. In 1502, it is determined whether the spreadsheet is to be updated. For example, a user is prompted to determine whether the user desires the spreadsheet to be updated or not. In some embodiments, the spreadsheet is automatically determined to be updated and step 502 is omitted with control passing straight to 1504. In the event that it is determined that the spreadsheet is not to be updated, the process ends. In the event that it is determined that the spreadsheet is to be updated, control asses to 1504. In 1504, it is determined whether the current spreadsheet is to be updated.

In the event that the current sheet is to be updated, control passes to 1506. In 1506, the spreadsheet data is updated based on updated database data, and the process ends. For example, the spreadsheet data (e.g., a data that is derived originally from a journal entry data in the database) is updated based at least in part on the updated database data. In some embodiments, updating includes aggregating the database data over a time period to determine an updated planning spreadsheet data. In some embodiments, updating includes aggregating the database data over a time period and disaggregating the aggregated data (e.g., spreading data over a set of time periods) to determine an updated planning spreadsheet data.

In the event that the current sheet is not to be updated, control passes to 1508. In 1508, a new spreadsheet is created based in the updated database data, and the process ends. For example, the spreadsheet data (e.g., a data that is derived originally from a journal entry data in the database) is generated based at least in part on the updated database data. In some embodiments, generating the spreadsheet data includes aggregating the database data over a time period to determine a new planning spreadsheet data. In some embodiments, generating includes aggregating the database data over a time period and disaggregating the aggregated data (e.g., spreading data over a set of time periods) to determine a new planning spreadsheet data. In some embodiments, a new spreadsheet includes one or more modifications or updates to a previous planning spreadsheet performed after the creation of the prior spreadsheet (e.g., associated with a current state or a checked in state of the prior planning spreadsheet).

In some embodiments, the current spreadsheet is updated automatically as a default and no option is given to open a new spreadsheet for the updated data from the database.

In some embodiments, a new spreadsheet is automatically created as a default and no option is given to update the current spreadsheet for the updated data from the database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for data transformation, comprising:
a database;
a spreadsheet storage of a spreadsheet for planning, wherein the database is synchronized with the spreadsheet;
an interface configured to:
receive, from the database, a database datum associated with a large time period;
receive, from the database, an indication that data associated with the database datum has changed to updated data; and
a processor configured to:
generate a plurality of spreadsheet data based at least in part on the database datum, wherein each spreadsheet datum is associated with one of a set of small time periods, wherein each spreadsheet datum is an allocated portion of an aggregate of the database datum associated with the set of small time periods, wherein the plurality of spreadsheet data is stored in the spreadsheet storage, and wherein the spreadsheet storage is separate from the database;
provide the plurality of spreadsheet data for display in the spreadsheet;
determine whether to update the displayed spreadsheet in response to the indication that the data associated with the database datum has changed; and
in response to determining not to update the displayed spreadsheet, create a new spreadsheet, wherein creating the new spreadsheet comprises:
aggregating an updated database datum associated with the set of small time periods to obtain an updated aggregate, wherein the updated database datum comprises the updated data; and updating a spreadsheet datum associated with a small time period of the set of small time periods based at least in part on the updated aggregate to obtain an updated spreadsheet datum.

2. The system of claim 1, wherein the database datum comprises numeric data.

3. The system of claim 1, wherein the large time period comprises one of: a decade, a year, a quarter, a month, a week.

4. The system of claim 1, wherein the small time period of the set of small time periods is smaller than the large time period.

5. The system of claim 1, wherein the small time period of the set of small time periods comprises one of: a year, a quarter, a month, a week, a day.

6. The system of claim 1, wherein each spreadsheet datum is determined by aggregating journal lines.

7. The system of claim 6, wherein aggregating journal lines comprises searching for journal lines.

8. The system of claim 7, wherein aggregating journal lines comprises searching for journal lines associated with similar data.

9. The system of claim 7, wherein aggregating journal lines comprises searching for journal lines associated with a time in the large time period.

10. The system of claim 7, wherein aggregating journal lines comprises searching for journal lines associated with a group.

11. The system of claim 1, wherein the processor is further configured to modify the plurality of spreadsheet data according to a rule.

12. The system of claim 11, wherein the rule applies differently to different data subgroups.

13. The system of claim 11, wherein the rule comprises a spreadsheet function.

14. The system of claim 11, wherein the rule is based at least in part on a spreadsheet cell.

15. The system of claim 1, wherein the plurality of spreadsheet data is provided for display in spreadsheet cells.

16. The system of claim 1, wherein the processor is further configured to generate labels for cells of small time periods.

17. The system of claim 1, wherein the processor is further configured to round spreadsheet data.

18. The system of claim 1, wherein the processor is further configured to evenly distribute the aggregate of the database datum among the set of small time periods.

19. The system of claim 1, wherein the processor is further configured to distribute the aggregate of the database datum among the set of small time periods according to rules.

20. A method for data transformation, comprising:

receiving, from a database, a database datum associated with a large time period;

generating in a spreadsheet, using a processor, a plurality of spreadsheet data based at least in part on the database datum, wherein the database is synchronized with the spreadsheet, wherein each spreadsheet datum is associated with one of a set of small time periods, wherein each spreadsheet datum is an allocated portion of an aggregate of the database datum associated with the set of small time periods, wherein the plurality of spreadsheet data is stored in a spreadsheet storage of a spreadsheet for planning, and wherein the spreadsheet storage is separate from the database;

providing the plurality of spreadsheet data for display in the spreadsheet;

receiving, from the database, an indication that data associated with the database datum has changed to updated data;

determining whether to update the displayed spreadsheet in response to the indication that the data associated with the database datum has changed; and in response to determining not to update the displayed spreadsheet, creating a new spreadsheet, wherein creating the new spreadsheet comprises:

aggregating an updated database datum associated with the set of small time periods to obtain an updated aggregate, wherein the updated database datum comprises the updated data; and updating a spreadsheet datum associated with a small time period of the set of small time periods based at least in part on the updated aggregate to obtain an updated spreadsheet datum.

21. A computer program product for data transformation, the computer program product being embodied in a non-transitory computer readable storage medium and comprising computer instructions for:

receiving, from a database, a database datum associated with a large time period;

generating in a spreadsheet a plurality of spreadsheet data based at least in part on the database datum, wherein the database is synchronized with the spreadsheet, wherein each spreadsheet datum is associated with one of a set of small time periods, wherein each spreadsheet datum is an allocated portion of an aggregate of the database datum associated with the set of small time periods, wherein the plurality of spreadsheet data is stored in a spreadsheet storage of a spreadsheet for planning, and wherein the spreadsheet storage is separate from the database;

providing the plurality of spreadsheet data for display in the spreadsheet;

receiving, from the database, an indication that data associated with the database datum has changed to updated data;

determining whether to update the displayed spreadsheet in response to the indication that the data associated with the database datum has changed; and in response to determining not to update the displayed spreadsheet, creating a new spreadsheet, wherein creating the new spreadsheet comprises:

aggregating an updated database datum associated with the set of small time periods to obtain an updated aggregate, wherein the updated database datum comprises the updated data; and updating a spreadsheet datum associated with a small time period of the set of small time periods based at least in part on the updated aggregate to obtain an updated spreadsheet datum.

\* \* \* \* \*